United States Patent [19]
Burton et al.

[11] Patent Number: 5,539,915
[45] Date of Patent: Jul. 23, 1996

[54] SYSTEM FOR COMPLETELY TRANSFERRING DATA FROM DISK HAVING LOW RATE TO BUFFER AND TRANSFERRING DATA FROM BUFFER TO COMPUTER THROUGH CHANNEL HAVING HIGHER RATE CONCURRENTLY

[75] Inventors: David A. Burton, Tucson, Ariz.; Yih-Ming Chu, Saratoga; Edward J. Nauss, Gilroy, both of Calif.

[73] Assignee: International Business Machines Corporation, Armonk, N.Y.

[21] Appl. No.: 946,981

[22] Filed: Sep. 17, 1992

[51] Int. Cl.⁶ .................................................. G06F 15/02
[52] U.S. Cl. .......................... 395/841; 395/250; 395/878; 364/236.2; 364/239.1; 364/241.9; 364/DIG. 1
[58] Field of Search ...................... 395/250, 275, 395/325, 425, 841, 878; 364/239, 239.1, 241.9, 236.2

[56] References Cited

U.S. PATENT DOCUMENTS

| | | | |
|---|---|---|---|
| 4,860,193 | 8/1989 | Bentley et al. | 395/250 |
| 4,926,324 | 5/1990 | Yamamoto et al. | 395/840 |
| 5,121,479 | 6/1992 | O'Brien | 395/250 |
| 5,146,576 | 9/1992 | Beardsley et al. | 395/440 |
| 5,303,095 | 4/1994 | Vuong | 360/46 |
| 5,347,637 | 9/1994 | Haeford | 395/310 |

*Primary Examiner*—Thomas C. Lee
*Assistant Examiner*—Moustafa M. Meky
*Attorney, Agent, or Firm*—Baker, Maxham, Jester & Meador

[57] ABSTRACT

A channel attached peripheral system is described which provides optimized data transfer when the channel has a higher data rate than the data source in the peripheral system. When a read request is received on the channel for data from the data source, the peripheral system estimates a source time as the time required to transfer the data from the data source into a buffer in the RAM and estimates a channel time as the time required to transfer of the units of data from the buffer to the computer over the channel. A channel reconnection time is determined. The transfer of the units of data from the data source into a buffer is initiated as soon as possible after the read request is received, but the transfer of data on the channel is delayed and commences in parallel with transfer of the units of data from the data source into the buffer, when the channel reconnection time has elapsed or when the time surrogate such as a number of cells has been transferred into the buffer.

12 Claims, 5 Drawing Sheets

SYSTEM FOR COMPLETELY TRANSFERRING DATA FROM DISK HAVING LOW RATE TO BUFFER AND TRANSFERRING DATA FROM BUFFER TO COMPUTER THROUGH CHANNEL HAVING HIGHER RATE CONCURRENTLY

TECHNICAL FIELD

The present invention relates to methods and systems in the field of pheripheral subsystem design and more particularly to methods and systems for managing channel utilization.

BACKGROUND OF THE INVENTION

Peripheral devices for large computers, e.g., tape and disk systems, need to send and/or receive data from the computer in large quantities. Various types of channels have been developed for this purpose. Typically the peripheral systems include a component called a controller which connects to the channel. The controller may be a physically separate device or it may be integrated into a single device. For example, integrated controller/disk file systems are sometimes called disk subsystems. The disk files contain the actual data storage hardware. The term subsystem will be used herein to refer to a peripheral system which attaches directly to a channel.

Typically the computer is operating under the control of a multiprogramming operating system, such as any one of IBM's well-known MVS family of operating systems, which allows multiple programs (or tasks) to execute in an interleaved manner so that the peripheral system is, in effect, shared by multiple programs. Since multiple computers may be connected to a subsystem, the sharing of the subsystem's resources can also occur between computers. To operate the subsystem a program running on the computer sends commands and data addressed to the subsystem out on the channel. The connection between the subsystem and the computer allows for two-way communication so that the subsystem can also send status information and data to the computer. The status information returned by the subsystem includes return codes indicative of the success or failure of the commands. Typical disk systems have means for detecting errors in read and write actions as well as various other functions. A typical subsystem includes one or more microprocessors and one or more memory means into which a special software program, typically called microcode or firmware, is loaded. The actions taken by the subsystem in response to commands usually involve the microprocessor running or executing some pad of the microcode. In a channel environment the commands sent to the controller may be called channel commands or channel command words (CCW). Channel commands are typically communicated to the controller in a list of connected commands which are called a channel command program or command chain (CCC). The channel commands in the channel program are said to be chained together. Typically a command chain has exclusive access to the subsystem only while the chain is executing. A computer program seeking to access a subsystem may have to send several command chains to achieve a desired result. The command chains from one program may be interleaved with chains from other programs by a single computer's operating system or by the different computers.

One conventional method of storing data on disk is the count-key-data (CKD) system. The beginning of each track is reserved for the 'track header' which consists of Home Address (HA) and Record Zero (R0) count fields. The HA contains a flag which indicates whether an alternate track has been assigned and the R0 count field is used to record the pointer to an alternate track. Following the HA and R0, variable length records are stored on the disk with a count field preceding the key and the data.

Since the channel must be shared by all of the attached subsystems, it is important to maximize the efficiency of channel usage. When the channel speed is higher than the device speed the timing of certain channel data transfers is critical for maximum efficiency. If channel data transfer begins too soon it cart waste a valuable resource and cause dangerous path congestion. Transfers begun too late may elongate subsystem service and response times. Prior art controllers usually use a grab and run type of algorithm where the channel is connected the entire time the device is transferring data. When optimized a high speed channel can be used to service several jobs in the time that it would have only serviced one using a grab and run technique. The technique of the invention described below yields better channel utilization and, therefore, higher performance.

SUMMARY OF THE INVENTION

The invention is a peripheral system and a method for operating a peripheral system to provide optimized data transfer between the peripheral system and a channel attached computer when the channel has a higher data rate than the data source in the peripheral system. When a read request is received on the channel for data from the data source, the peripheral system estimates a source time as the time required to transfer the data from the data source into a buffer in the RAM and estimates a channel time as the time required to transfer the units of data from the buffer to the computer over the channel. A channel reconnection time may be determined by any one of several methods, e.g., subtracting the channel time from the source time or by multiplying the source time by one minus the ratio of the data source's data rate to the channel's data rate, etc. The times need not be computed directly, but can be measured by surrogates such as the number of disk cells subscribed by the data to be read. The transfer of the units of data from the data source into a buffer in the RAM is initiated as soon as possible after the read request is received, but the transfer of data on the channel is delayed and commences in parallel with transfer of the units of data from the data source into the buffer, when the channel reconnection time has elapsed or when the time surrogate event occurs such as a number of cells having been transferred into the buffer. The channel reconnection time may be adjusted to compensate for overhead involved in count and key fields in the data and for overhead in the channel reconnection process. The adjustment implies that the peripheral system will start the reconnection slightly earlier to allow for the extra overhead time.

DETAILED DESCRIPTION OF THE INVENTION

The invention provides an approximate but robust method for approximating the ideal solution to the channel-scheduling problem. It is designed, on average, to bring the data-reading operation to an early end while using high-speed channels with great efficiency. The method, which will be described for estimating the proper point in time to begin transfer of data on the channel, uses the number of disk cells to be transferred as the surrogate for the direct estimation of the time required to transfer the requested data into the buffer. For devices other than disk systems another surrogate may be used. Once the measure of the time required to get data from the data source, e.g., disk, into the buffer is determined, the proper reconnection point may be found by multiplying the measure by the ratio (or one minus the ratio) of the data source speed to the channel speed. This ratio will be referred to as DCR. If the reconnection point is being measured from the start of tile source data transfer, then reconnection should occur at the point when 1—DCR of the source data has been placed in the buffer. Alternatively, the data source time may be found and the channel transfer time subtracted therefrom to find the proper reconnection point.

Figure 1:
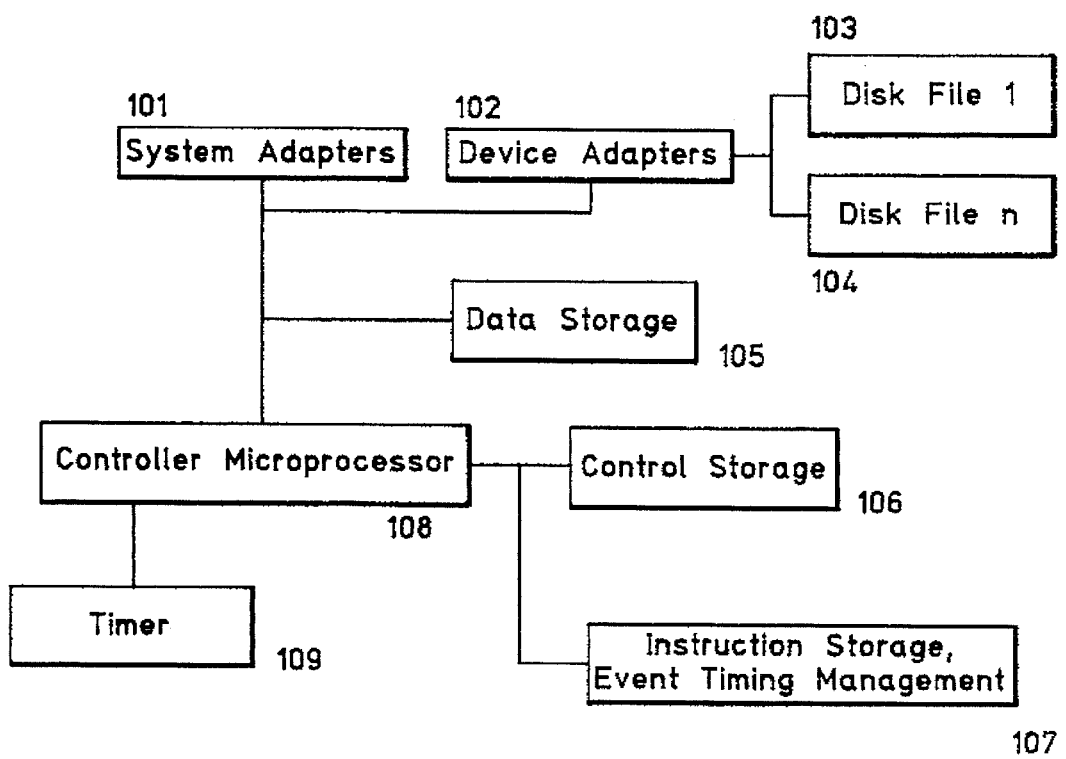
FIG. 1 is a block diagram of a disk subsystem using the invention.

The detailed embodiment of the invention which will be described is a controller for a disk subsystem. The broad components of the system of the invention will be described with reference to FIG. 1. The interfaces to the one or more computers using the direct access subsystem (DASS) are called system adapters 101. The system adapters connect to the channels and receive commands and data from the computers and can generate interrupts and send data on the channels to the computers. The interfaces to the one or more disk files contained in the DASS are called device adapters 102. The disk files 103, 104 contain the heads and actual magnetic or opto-magnetic disks. Any equivalent type of storage devices may be used in the context of the invention. In some data storage systems the disk files are separately packaged components and the other components shown in FIG. 1 are called the subsystem (or cluster) controller. The data storage 105 for the system is where the buffers are located which are used to store data transferred from the disk files. The supervisory function of the system is performed by the controller microprocessor 108. The instructions to be executed by the microprocessor are stored in the instruction storage 107 which may be RAM or ROM. The system has a timer 109 which is used to measure time intervals. When RAM is used for the instruction storage, the control instructions (microcode) will be loaded into the RAM from one of the disk files when the DASS is initialized. The control storage 106 is RAM in which the controller stores temporary data indicative of the status of operation, etc. The management function of the invention is controlled by action of the microprocessor executing specially written microcode stored in the instruction storage. Some or all of the functions described below could also be implemented using standard electrical engineering techniques instead of in microcode or firmware.

The functional environment is in count-key-data (CKD) subsystems where the channel speed is greater than tile maximum rate at which the slowest component of the subsystem can supply data. In a disk subsystem the slowest data source component is the rotating disk. The controller (or control unit) has a higher speed capability and can match the channel speed when the data to be transferred already resides in its buffer. The channel used in the embodiment of the invention is a serial channel. The channel can accept data out of the buffer at a faster rate than the device can transfer data into the buffer from disk. However, if the high-speed channel transfer begins very shortly after the device transfer does, then the channel will typically catch up to the point in the buffer where the device is storing the data that is presently being read from disk. Thereafter, until end of transfer, the channel data rate will be slowed down to match the disk transfer speed, since additional data cannot be removed any faster than the device can store it into the buffer. This makes for channel utilization times that are unnecessarily high and channel busy periods that are longer than need be.

Figure 2A:
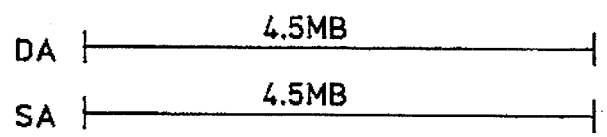
FIG. 2A illustrates the device adapter and system adapter timings for the "Grab and Run" method.
Figure 2B:
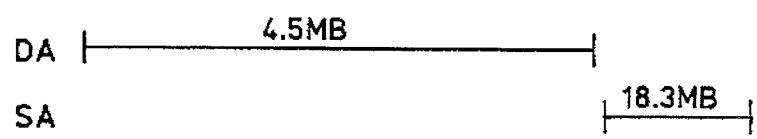
FIG. 2B illustrates the device adapter and system adapter timings for the "Store and Forward" method.
Figure 2C:
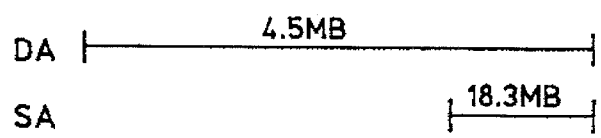
FIG. 2C illustrates the device adapter and system adapter timings for the the invention.

Reference is made to FIGS. 2A–C to illustrate the event timings of the invention versus tile alternatives. The disk subsystem is assumed to have a transfer rate into its buffer from disk of 4.5 megabytes (MB) per second while the channel is assumed to have a maximum data rate of 18.3 MB. The lines labeled "DA" represent the amount of time taken to transfer a fixed amount of data from disk into the buffer by the device adapter. The lines labeled "SA" illustrate the channel utilization time by the system adapter. Elapsed time increases from left to right in the figures. FIG. 2A illustrates the grab and run event timings. The SA line equals the DA which illustrates that the channel is being used at a data rate of 4.5 MB, i.e., below its capacity. An alternative simple procedure, called "store and forward", illustrated in FIG. 2B, is to start the channel transfer only when all data to be read has been fetched into the buffer. Thus the SA line starts only after the DA line ends. The channel is not forced to slow down to match the device transfer rate, so channel utilization and service periods are ideally small. The great drawback of this scheme is that I/O request service time is elongated by however long the channel transfer lasts. The SA timing of the invention in FIG. 2C shows that the channel transfer is begun at a point when the buffer is partially full, so that the SA transfer ends at approximately the same time as the DA transfer. The optimum procedure has the channel transfer starling at just the "right" time—a time such that the channel need not slow down to device adapter speed, yet ends its transfer out of the buffer at essentially the same time that the device transfer into the buffer ends. In practice this ideal solution is not exactly attainable. In general, there are unpredictable delays in acquiring a channel not dedicated to the device in use. Moreover, there may be additional unpredictable delays in sub-conversation between control unit function and host system. And beyond that, the time required to initialize channel transfer may vary in unforeseeable ways.

PRE-NOTIFY CELL CALCULATIONS

The channel speed is estimated using information in Establish Logical Path (ELP) frames. ELP frames are defined as pad of the well-known and well documented ESCON architecture. In environments other than ESCON whatever means are available to either estimate the channel speed or know tile channel speed a priori, as for fixed speed channels, can be used. This information along with information specific to a channel program is used to calculate the proper point on the disk (cell number) at which the channel transfer should begin. It is conventional to divide a track into a predetermined number of cells which can be used to address portions of the track. Records start on cell boundaries. The device on which the invention was implemented had 1420 cells per track.

CALCULATE PRE$_{13}$NOTIFY CELL

The process of calculation is divided into two parts:

1. Estimate the Pre_Notify Cell. This pad is dependent upon the channel and device data transfer rate, required buffer space, number of records being transferred within the buffer, Transfer Length Factor, record overhead and request code.
2. Adjust the estimated Pre_notify cell to the Pre_Notify Cell to allow for the time lag introduced by the overhead of establishing the channel connection and the count and key fields in the data. This amount of adjustment required for channel connection should be determined empirically based on the embodiment by actually performing test measurements on how long it takes to reconnect to the channel. If, for example, the tests found that 12 microseconds were on average required for reconnection, then the reconnection process should be adjusted 12 microseconds before the estimated point at which data transfer should actually begin. This adjustment can only be done when tile orientation is established. Orientation occurs when the head reaches the desired angular position over the rotating disk for the data to be read. In the orientation mode is current record, the adjustment will be done at the post count field. If the orientation mode is prior record, then the adjustment will be done at the post data field. Further adjustment is made when the track switch occurs to account for the Home Address and Record Zero overhead.

The method for Estimating Pre_Notify Cell varies for Read n Records, Read n Tracks and Error Recovery (ER).

Figure 3:
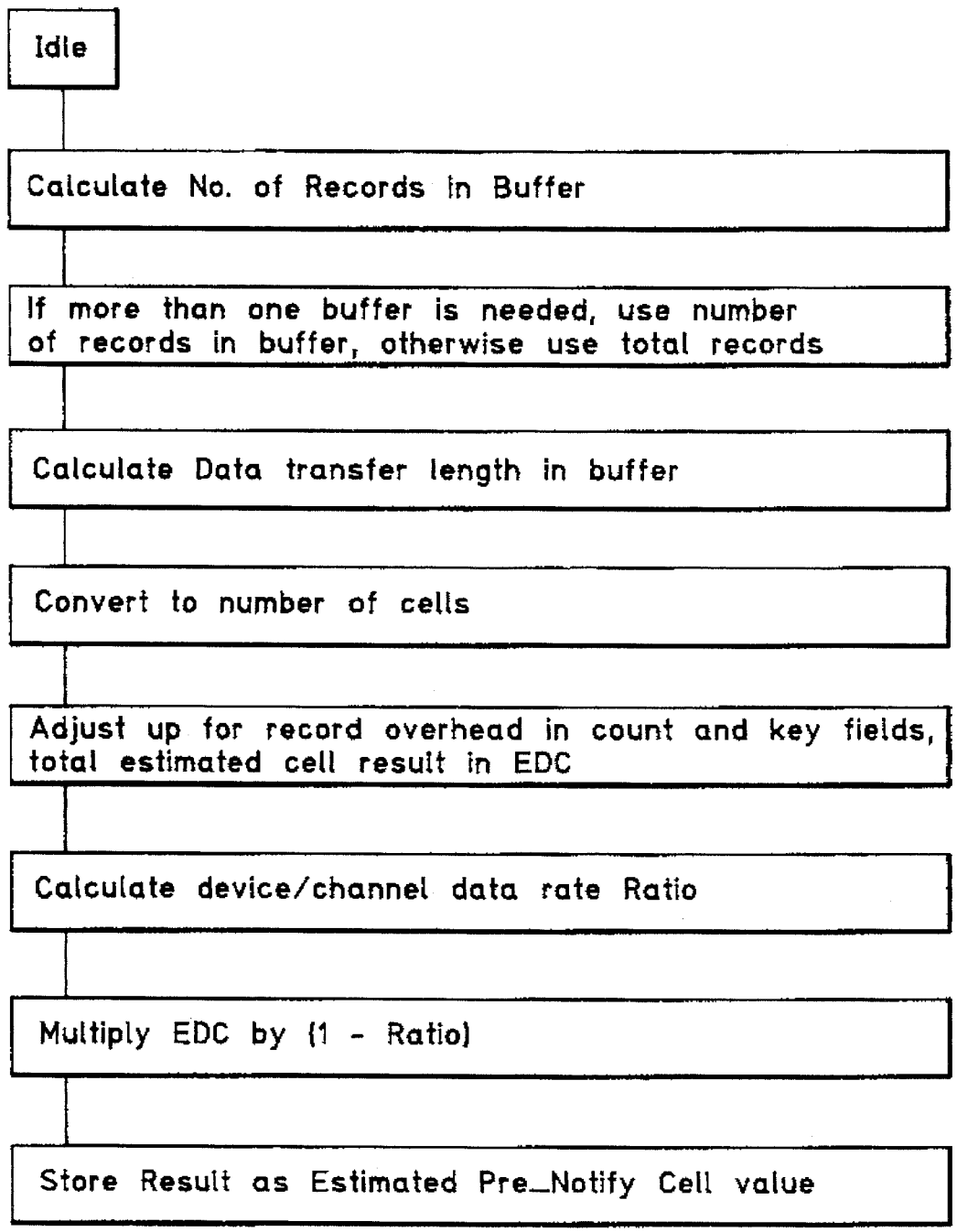
FIG. 3 illustrates the method of estimating the Pre_Notify Cell for Read n Records.
Figure 4:
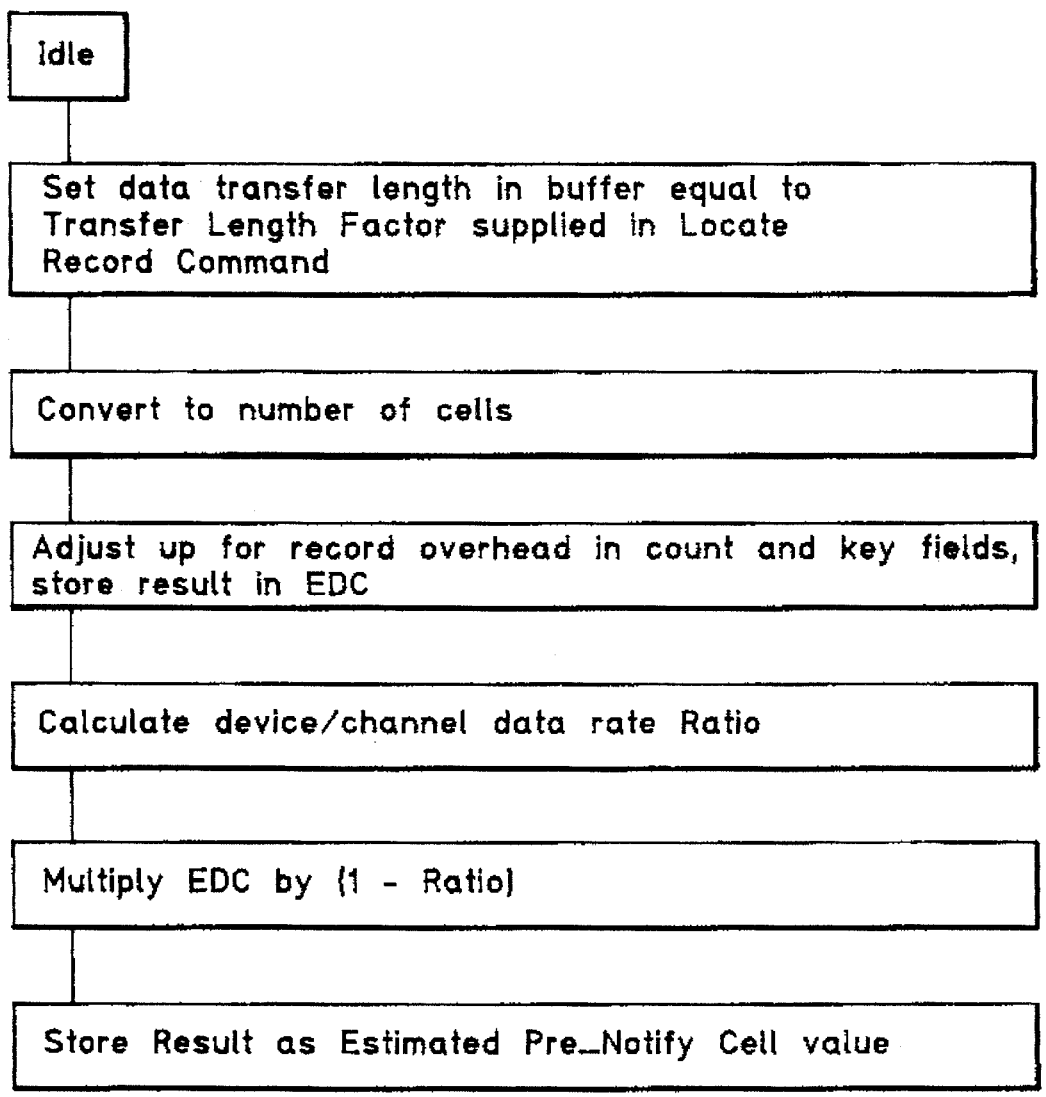
FIG. 4 illustrates the method of estimating the Pre_Notify Cell for Read n Tracks requests.
Figure 5:
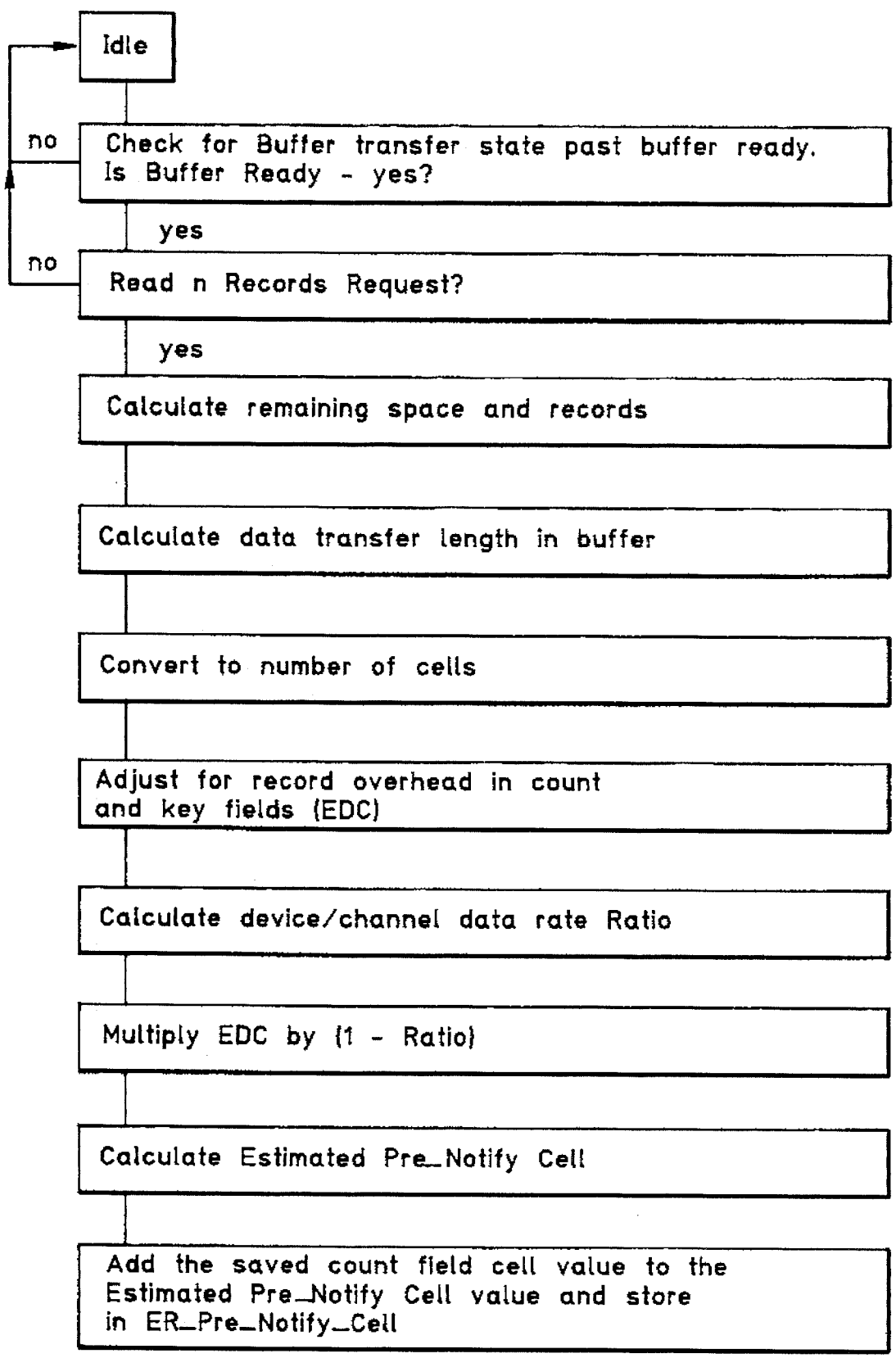
FIG. 5 illustrates the method of estimating the Pre_Notify Cell For ER.

Definitions:

*=Multiply
/=Divide
G3=Pre_Count Field in Cells
G2=Post_Count Field in Cells
Count Field in cells (1 Cell)
Rc=Device Transfer Count (Track or Record Count)
BRc=Device Transfer Count per Buffer - Records per Buffer
TLF=Transfer Length Factor (supplied in Locate Record command)
RS=Require_Buffer_Space in bytes - total allocated buffer size
BTB=Buffer Transfer Length, in bytes
BTC=Buffer Transfer Length, in cells
EDC=Estimate Device Cell Transitions per buffer, in cells
EPC=Estimate Pre_Notify Cell Value, in cells
DCR=Device to channel data rate ratio (1-Device Data transfer rate/Channel Data transfer rate) Read Record Method Read Record request operates on a Single Track per Buffer environment. The estimated pre-notify cell is stored in the 'Single_Trk_Pre_Notify_Cell' parameter in the Task Control Block (TCB) in the Control Storage RAM. Reference is made to FIG. 3 which illustrates the logic flow of the method of estimating the Pre_Notify Cell for Read n Records. In FIGS. 3–5 the flow is from the top to the bottom except where arrows indicate otherwise.

- Calculate the BRc=(RS/TLF).

The allocated buffer size in the embodiment of the invention is variable, but could be a fixed size in other embodiments.

- Compare the Rc with BRc, if BRc is greater than the Rc, set BRc=Rc
- Calculate the BTB=BRc*TLF.
- Calculate BTC=BTB/32. (There arc 32 bytes per cell).
- Calculate Estimated Device Cell Transitions (BTC+ Record Overhead)

EDC=BTC+BRc(G3+G2+1).

- Calculate the DCR(1-Device to Channel data Rate Ratio)

DCR=(1-Device Transfer Data Rate/Channel Transfer Data Rate)

- Calculate Estimated Pre_Notify Cell Value (EPC).

EPC=(EDC*DCR).

Read Track Method

Read Track request also operates on a Single Track per Buffer environment. The result will be stored in the 'Single_Trk_Pre_Notify_Cell' parameter in the TCB. Reference is made to FIG. 4 which illustrates the logic flow of the method of estimating the Pre_Notify Cell for Read n Tracks requests.

- Set the Transfer Length Factor=Buffer Transfer Length (BTB).
- Set BRc=1.
- Calculate BTC=BTB/32.
- Calculate Estimated Device Cell Transitions (BTC+ Record Overhead)

EDC=BTC+(G3+G2+1).

- Calculate the DCR.

DCR=(1-Device Transfer Data Rate/Channel Transfer Data Rate)

- Calculate the Estimated Pre_Notify Cell Value (EPC).

EPC=(EDC*DCR).

Error Recovery (ER) Method

ER will invoke this service before the track reorientation. For Read Record request, if the error occurred after the Pre-Notify message had been sent to the trailer, this service will re-calculate the estimated pre-notify cell for the remaining buffer space. The new estimated cell value will be saved in the 'ER_Pre_Notify_Cell' parameter in the TCB. Reference is made to FIG. 5 which illustrates the logic flow for the method of estimating the Pre_Notify Cell For ER. If the buffer transfer state has not passed the buffer ready point or the request is not a Read n Records request, then the previously calculated Pre_Notify cell is used as the ER_Pre_Notify_Cell value. Thus, the two "NO" decisions for these points in the logic diagram show that no further calculation is needed.

- The error occurred before the Pre_Notify Cell.

This means the Buffer Transfer State is either Notify Trailing Process or Null The service will reload the saved ER_Pre_Notify_Cell to the device track.

- The error occurred after the Pre_Notify Cell.

This means the Buffer Transfer State is Buffer Ready

The method follows:
  Read n Records
    Obtain the required buffer space pointer.
    Obtain the buffer point at error.
    Calculate the remaining buffer space and number of records to be transferred by this buffer.
    The other values are calculated the same as for the Single Track Buffer Style Pre_Notify Cell.
    Add saved count field native cell number to the above estimated Pre_Notify Cell.
  Read n Tracks
    Reload the saved ER_Pre_Notify_Cell to the device track.

Figure 6:
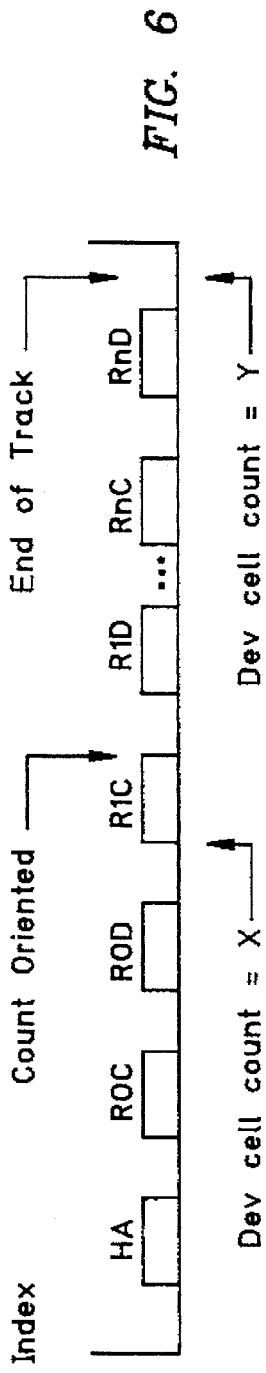
FIG. 6 illustrates the first track of an example for a Read n Records Request (Multi Track Buffer) Channel Reconnection.
Figure 7:
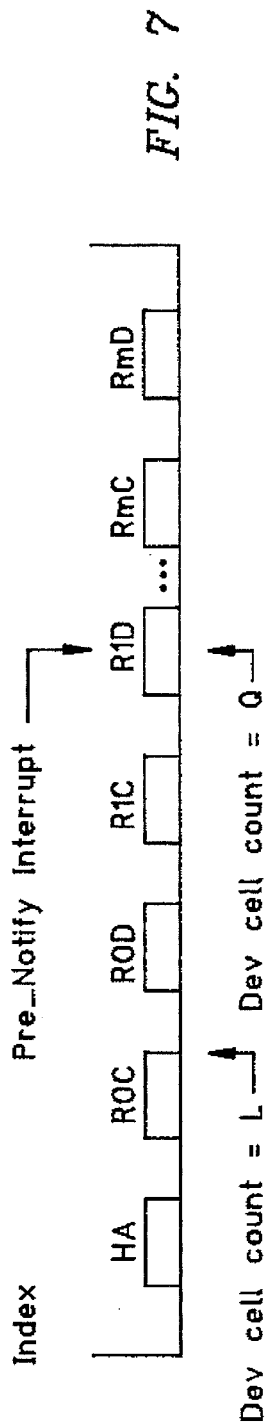
FIG. 7 illustrates the second track of an example for a Read n Records Request (Multi Track Buffer) Channel Reconnection.
Figure 8:
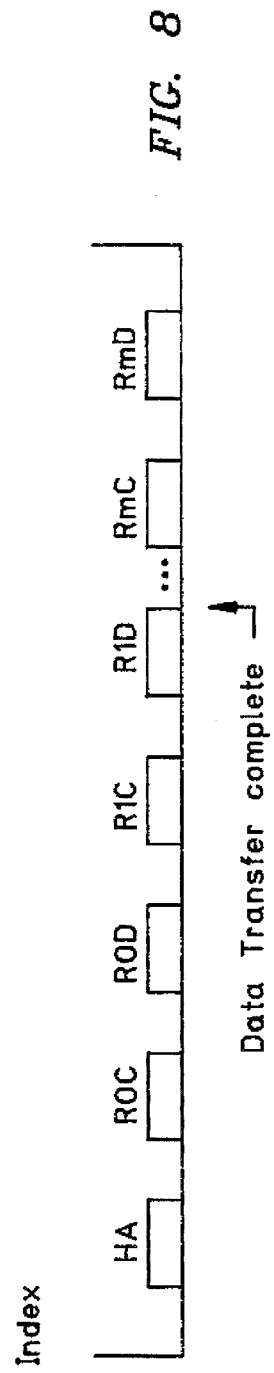
FIG. 8 illustrates the third track of an example for a Read n Records Request (Multi Track Buffer) Channel Reconnection.

Reference will be made to FIGS. 6–8 which will be used to illustrate an example for Read n record Request (Multi Track Buffer) Channel Reconnection process. In these figures "R0C", "R1C", "RmC" and "RnC" represent the record 0, 1, m and n counts respectively. "R0D", "R1D", "RmD" and "RnD" represent the record 0, 1, m and n data fields respectively. "HA" is home address for the indicated track.

FIG. 6 shows the first track which will be transferred into the buffer then across the channel to the computer. Using X as the device cell count prior to R1C and Y as the device cell count after RnD and P as the calculated Pre_notify Cell value:

---

Load cell value = P + X into DA;
Assume Y < P + X;
At end of track Do;
    R = P + X − Y; (adjust the Pre_notify cell value to next track)

---

FIG. 7 shows the second track which will be transferred. Reconnection to the channel occurs at Track 2 in the R1 data field (R1D) when the Pre_Notify Interrupt is issued by the system adapter. Using L as the device cell count at the end of R0C in track 2 and Q as the device cell count during R1D in track 2, at the end of R0 count do:

---

R + L (add track header overhead);
Q = or > R + L;    Generate Interrupt from device adapter (DA);
                   Send message to system adapter for Channel Reconnect;
                   Channel start data transfer;

---

FIG. 8 shows the third track which will be transferred. Data transfer completes at track 3 after R1D.

Using the foregoing specifications the invention may be implemented using standard programming and/or engineering techniques. The resulting program(s) may be stored on disk, diskettes, memory cards, ROM or any other memory device. For execution, the program may be copied into the RAM of the subsystem. While the preferred embodiment of the present invention has been illustrated in detail, it should be apparent that modifications and adaptations to that embodiment may occur to one skilled in the art without departing from the scope of the present invention as set forth in the following claims.

What is claimed is:

1. A method of operating a disk data storage system having a processor, a RAM, and a data source and being operably connected to a computer through a channel, the channel having a higher data rate than the disk data storage system, comprising the steps of:

determining the time T required for initialization of the channel for data transfer; receiving a read request on the channel for units of data from the disk data storage system;

estimating a source time as the time required to transfer the units of data from the disk data storage system into a buffer in the RAM;

estimating a channel time as the time required to transfer the units of data from the buffer to the computer over the channel;

determining a channel reconnection time by subtracting the channel time from the source time or by multiplying the source time by one minus the ratio of the disk data storage system's data rate to the channel's data rate;

initiating transfer of the units of data from the disk data storage system into a buffer in the RAM;

performing initialization of the channel for data transfer at the time T prior to the channel reconnection time; and commencing, in parallel with transfer of the units of data from the disk data storage system into the buffer, data transfer from the buffer to the computer when the channel reconnection time has elapsed, wherein the transfer of units of data from the disk data storage system and the transfer of units of data from the buffer to the computer both end at the same time.

2. The method of claim 1 wherein the disk data storage system having data stored in a plurality of cells, the step of estimating a source time further comprising the steps of:

determining a number or bytes of data being requested in the read request:

finding a number of cells by dividing the number of bytes by the number of bytes in a cell; and using the number of cells as the measure of the data source time.

3. The method of claim 2 further comprising the step of adjusting the number of cells used as the measure of the data source time upward to compensate for overhead involved in count and key fields in the data.

4. The method of claim 1 wherein the performing step further comprising steps of adjusting the time T based on orientation of the head on the disk by increasing time the T if the orientation is such that reading the data will be delayed.

5. A peripheral system having a processor, a RAM, a data source and means for connection to a computer through a channel, he channel having a higher data rate than the data source, comprising:

means for determining an initialization time T equal to the time it takes to reconnect the channel;

means for receiving a read request on the channel for units of data from the data source;

means for estimating a source time as the time required to transfer the units of data from the data source into a buffer in the RAM;

means for estimating a channel time as the time required to transfer the units of data from the buffer to the computer over the channel;

means for determining a channel reconnection time by subtracting the channel time from the source time or by multiplying the source time by one minus the ratio of the data source's data rate to the channel's data rate;

means for initiating transfer of the units of data from the data source into a buffer in the RAM;

means for performing initialization of the channel for data transfer at the time T prior to the channel reconnection time; and means for commencing, in parallel with transfer of the units of data from the data source into the buffer, data transfer from the buffer to the computer when the channel reconnection time has elapsed, wherein the transfer of unit data from the data source and the transfer of units of data from the buffer both end at the same time.

6. The system of claim 5 wherein the data source is a disk having data stored in a plurality of cells, the means for estimating a source time further comprising:

means for determining a number of bytes of data being requested in the read request;

means for finding a number of cells by dividing the number of bytes by the number of bytes in a cell; and means for using the number of cells as the measure of the data source time.

7. The system of claim 6 further comprising means for adjusting the number of cells used as the measure of the data source time upward to compensate for overhead involved in count and key fields in the data.

8. The system of claim 5 wherein the means for performing further comprising means for adjusting the time T based on orientation of the head on the disk by increasing the time T if the orientation is such that reading the data will be delayed.

9. A controller for peripheral system, having a processor, a RAM, means for connection to a data source and means for connection to a computer through a channel, the channel having a higher data rate than the data source, comprising:

means for determining the time T required for initialization of the channel for data transfer;

means for receiving a read request on the channel for units of data from the data source;

means for estimating a source time as the time required to transfer the units of data from the data source into a buffer in the RAM;

means for estimating a channel time as the time required to transfer the units of data from the buffer to the computer over the channel;

means for determining a channel reconnection time by subtracting the channel time from the source time or by multiplying the source time by one minus the ratio of the data source's data rate to the channel's data rate;

means for initiating transfer of the units of data from the data source into a buffer in the RAM;

means for performing initialization of the channel for data transfer at the time T prior to the channel reconnection time; and means for commencing, in parallel with transfer of the units of data from the data source into the buffer, data transfer from the buffer to the computer when the channel reconnection time has elapsed, wherein the transfer of units of data from the data source and the transfer of units of data from the buffer to the computer both end at the same time.

10. The controller of claim 9 wherein the data source is a disk having data stored in a plurality of cells, the means for estimating a source time further comprising:

means for determining a number of bytes of data being requested in the read request;

means for finding a number of cells by dividing the number of bytes by the number of bytes in a cell; and means for using the number of cells as the measure of the data source time.

11. The controller of claim 10 further comprising means for adjusting the number of cells used as the measure of the data source time upward to compensate for overhead involved in count and key fields in the data.

12. The controller of claim 9 wherein, the means for performing further comprising means for adjusting the time T based on orientation of the head on the disk by increasing the time T if the orientation is such that reading the data will be delayed.

* * * * *